(12) United States Patent
Gatto et al.

(10) Patent No.: US 6,344,906 B1
(45) Date of Patent: Feb. 5, 2002

(54) UNIVERSAL DOCUMENT SCANNER CONTROLLER

(75) Inventors: Jean-Marie Gatto, London (GB); Thierry Brunet De Courssou, Palo Alto, CA (US); Salim Callec, Soisy sous Montmorency (FR)

(73) Assignee: Cyberscan Technology, Inc., Palo Alto, CA (US)

( * ) Notice: Subject to any disclaimer, the term of this patent is extended or adjusted under 35 U.S.C. 154(b) by 0 days.

(21) Appl. No.: 08/931,131

(22) Filed: Sep. 16, 1997

(51) Int. Cl.[7] ................................................. H04N 1/40
(52) U.S. Cl. ....................... 358/443; 358/468; 358/471; 358/474
(58) Field of Search ................................ 358/443, 468, 358/471, 474, 482, 513

(56) References Cited

U.S. PATENT DOCUMENTS

| 4,506,301 A | * | 3/1985 | Kingsley et al. | 358/451 |
| 4,760,466 A | * | 7/1988 | Nakamura | 358/482 |
| 4,882,631 A | * | 11/1989 | Mine et al. | 358/471 |

FOREIGN PATENT DOCUMENTS

| GB | 0 741 482 A2 | 11/1996 |
| JP | 06268818 | 9/1994 |
| JP | 07262317 | 10/1995 |
| JP | 09067042 | 3/1997 |

OTHER PUBLICATIONS

Akihiro Higashi et al: "A Standard Multipurpose Fax Processor" IEEE Transactions on Consumer Electronics, vol. 37, No. 3., Aug. 1991, pp. 567–571, XP002148316 USA.

Toyota Honda: "Compacting Technologies For Small Size Personal Facsimile" IEEE Transactions on Consumer Electronics, vol. 38, No. 3, Aug. 1992, pp. 417–423, XP002148317 USA.

* cited by examiner

Primary Examiner—Thomas D. Lee
(74) Attorney, Agent, or Firm—Young Law Firm, P.C.

(57) ABSTRACT

A circuit implemented on a single piece of silicon or a low cost hybrid circuit that controls all the functions required to operate sheet-fed, flatbed, handheld, slides, duplex, drum and 2D still-image document scanners. The circuit performs monochrome image sensor management, color image sensor management, light source modulation, motor management, Anti-Skew Auto-Start, pixel correction, adaptative thresholding, black-sides removal, image enhancement, dithering, up/down sampling, image compression, scan and forward action management, memory management, and host interface management with plug and play capability.

37 Claims, 8 Drawing Sheets

UNIVERSAL DOCUMENT SCANNER CONTROLLER

BACKGROUND OF THE INVENTION

1. Field of the Invention

The invention pertains to the field of document scanners.

2. Description of the Related Art

A document scanner is an extremely desirable peripheral that computer users would like to have available on their computer, like a floppy disk drive, a printer, a modem or a multimedia sound card. While prices of document scanners for personal computers users are rapidly declining, document scanners have not yet realized their anticipated success due to lack of integration, difficulty of use and slow speed.

Scanner technology requires knowledge and mastery of numerous disciplines: monochrome image sensors, color image sensors, light sources, stepper motors, paper feeders, motion drive mechanisms, power supplies, host interfaces, image processing and document processing. The intense price competition for basic document scanner models from Asian manufacturers forces non-Asian companies to abandon investment in that area. Innovation suffers and advancement in document scanner technology lags. Only manufacturers of sophisticated, extremely fast, bulky and expensive high volume document scanners enjoy a healthy growth.

Existing scanner technologies are essentially controlled by software running on a microprocessor that cooperates with a host computer. Only expensive microprocessors can process high-resolution document information at high speed. Scanners for the consumer market are generally too slow to provide any user productivity gain.

Furthermore, there are several types of scanners, each scanner type being specifically designed for a specific purpose: monochrome, color, sheet-fed, flatbed, handheld, photo-print, photo-slide, SCSI host interface, printer port host interface, IEEE1284 parallel port host interface, serial port host interface, USB host interface, IEEE1394 FireWire host interface, among others. Development costs and time to market are therefore significant. Only scanner manufacturers that are fully committed to document scanner products can afford to be involved in document scanner developments. Manufacturers that wish to incorporate document scanner functions into other types of devices (multifunction peripherals, for example) in order to differentiate their products from those of the competition have experienced difficulties reaching their goal.

Furthermore, it is well known that keyboards are the limiting factor in the man-machine interface, and large sums of money are being invested in the field of voice recognition/ activation. There is also significant potential for handwriting activation, where instructions are handwritten on a small piece of paper and then scanned through a small low cost scanner and interpreted by a suitable software application. People do not always have a computer on-hand to key-in instructions, or a microphone to speak instructions into, but pen and paper is universal.

SUMMARY OF THE INVENTION

It is, therefore, an object of the present invention to provide manufacturers of consumer scanners with an inexpensive, highly integrated and easy to integrate scanner controller.

It is another object of the present invention to provide manufacturers with a scanner controller that integrates all scanner control functions on a single piece of silicon, or is integrated on a low cost hybrid circuit, together with logic for other peripheral functions.

It is yet another object of the present invention to provide manufacturers with a scanner controller device that can readily be integrated in a wide variety of consumer electronics, such as VCRs, microwave ovens, to name a few.

It is a further object of the present invention to provide manufacturers with a scanner controller for devices other than personal computers that is easy to integrate into their existing products, is inexpensive and enables increased functionality.

It is yet another object of the present invention to provide a scanner controller which is compatible with all types of scanners, such as monochrome, color, sheet-fed, flatbed, handheld, photo-print, photo-slide, among others. Furthermore, it is a further object of the present invention to provide a scanner controller which is also compatible with a great many host interface standards, such as SCSI, printer port, IEEE1284 parallel port, serial port, USB, IEEE1394 FireWire, among others.

It is also an object of the present invention to provide a scanner controller which is equipped for handwriting activation, where instructions are handwritten on a small piece of paper and then scanned through a small low cost scanner and interpreted by a suitable software application.

In accordance with the above-described objects and those that will be mentioned and will become apparent below, the Universal Document Scanner Controller according to the present invention is a circuit that integrates all of the control functions that are required to operate all types of monochrome and color document scanners.

The Universal Document Scanner Controller according to the present invention is designed to totally operate on a single piece of silicon or a low cost hybrid circuit, in order to achieve extremely fast performance. The specialized functions are entirely performed by the controller, which considerably simplifies the overall circuitry necessary to operate the scanner. The controller circuit according to the present invention can be mass-produced at a very competitive price. Manufacturers that wish to integrate a document scanner into other types of devices such as printers, keyboards, computer cases, display monitors, etc. to differentiate their products can expect a significantly reduced time to market, a very high performing product, and an extremely competitive price.

According to an exemplary embodiment, the scanner controller for controlling a document scanner according to the present invention comprises:

an internal bus;

an image sensor control unit, the image sensor control unit controlling and acquiring image data from at least one image sensor;

a pixel correction unit, the pixel correction unit performing calibration correction at a rate that matches an input pixel rate;

a motor control unit, the motor control unit controlling at least one motor; and a host interface unit, the host interface unit controlling communication between the scanner controller circuit and a host computer.

The image sensor unit, the pixel correction unit, the motor control unit and the host interface unit are each connected to the internal bus. An advantage of the above-defined scanner controller is that it is readily implemented on a single piece of silicon, a multichip circuit, or a single piece of silicon together with other added circuits.

The motors controlled by the motor control unit may be stepper motors and/or linear motors.

The host interface unit supports tightly coupled communication links between the scanner controller and a host computer, such as an ISA bus, an EISA bus, a PCI bus, a VL bus, Intel AGP Advanced Graphics Port, a CPU data bus or a CPU local bus. The host interface unit also supports a direct link between the scanner controller and the host computer, such as a Floppy disk bus, an ATA bus, an ATAPI bus, an IDE bus, a removable IDE bus, an EIDE bus, a PCMCIA Bus, a Card Bus or a direct connection to the host interface. The host interface unit also supports loosely coupled communication links between the scanner controller and the host computer, such as a Serial, Printer port, EPP, ECP, IEEE1284, USB, SCSI, IEEE1394, Ethernet, Intranet, Modem, ISDN, ATM, IrDA, AppleTalk, ADSL, HDSL, TCP/AIP, wired, wireless, public, private, secured or unsecured communication link. Additionally, the host interface unit supports the Plug and Play requirements and standard. Moreover, the host interface unit is capable of simultaneously supporting at least two communication links between the scanner controller and the host computer in order to achieve higher data throughput than is possible with a single communication link.

A clock generator unit may be connected to the internal bus, the clock generator providing all timing signals required by all internal functions and external functions of the scanner controller. A memory control unit may also be connected to the internal bus, the memory control unit providing and controlling an access to internal and external volatile and non-volatile memory. The memory control unit may include one or a plurality of the volatile and non-volatile memories.

According to another embodiment of the present invention, a packing unit may also be connected to the internal bus, the packing unit packing and encapsulating pixels to satisfy an ordering of bits, as required by a host computer application.

A light source control unit may also be connected to the internal bus, the light source control unit controlling an illumination of all light sources used in document scanners. The light source control unit may perform light source modulation for monochrome LED light sources, color LED light sources, CCFL Cold Cathode Fluorescent Light tubes, Electroluminescent screens and/or filament lamps. This light source control unit may also perform selection of color filters for filter-type color scanners and for color-drop-out-type scanner, and may control one or a plurality of external Digital to Analog Converter and associated power circuits to control illumination switch-on, switch-off and intensity modulation.

A general-purpose status and controls unit may be connected to the internal bus, the general-purpose status and controls unit monitoring and sending event signals. The scanner controller according to the present invention may also include a black-side removal unit connected to the internal bus, the black-side removal unit being capable of removing pixels that are unrelated to the scanned document.

An Anti-Skew Auto-Start control unit may be connected to the internal bus, the Anti-Skew Auto-Start control unit ensuring that an edge of the document that is inserted into the document scanner is perfectly aligned in a scanner input before enabling a scanning operation, to automatically scan the document without unacceptable skew.

The scanner controller may also include an adaptative thresholding unit connected to the internal bus, the adaptative thresholding unit being capable of distinguishing relevant features from a background in a conversion from gray level pixels to black and white pixels. An image enhancement unit may also be integrated within the scanner controller according to the present invention, and connected to the internal bus.

The scanner controller according to the present invention may also include an image enhancement unit, a compression unit, a pixel dithering unit, a pattern recognition unit, all connected to the internal bus, and carrying out image enhancement, compression, pixel dithering, and pattern recognition using public algorithms, licensed algorithms, derived algorithms or specially developed algorithms.

An up and down sampling unit may be connected to the internal bus, the up and down sampling unit being capable of performing up-sampling or down-sampling of pixels. A rotary encoder control unit may also be connected to the internal bus, the rotary encoder control unit providing all necessary inputs and processing logic for decoding signals delivered by at least one rotary encoder. A mouse control unit may be connected to the internal circuit, the mouse control unit controlling either a standard mouse or an equivalent pointing device, and interpreting displacements and button selections.

A core Central Processing Unit may alternatively be connected to the internal bus, the core Central Processing Unit operating with programmed instructions contained in memory, the core central Processing Unit being synthesized from a public domain or commercial ASIC module library that can be added to the scanner controller to perform auxiliary functions.

A power management unit may be connected to the internal bus, the power management unit minimizing power consumption of all circuits in the document scanner controlled by the scanner controller circuit. Power circuits may also be included in the Scanner controller according to the present invention, which power circuits directly control all power functions of the document scanner. In addition to the power circuits, communication circuits, graphics display control circuits, keyboard control circuits, printer control circuits, auxiliary processing circuits and input device control circuits may be included in the controller, to control a complete multifunction peripheral, a complete off-line or an on-line document scanning terminal.

According to an embodiment of the present invention, the pixel correction unit performs, at the input pixel rate, linear and non-linear pixel correction including offset, gain, gamma and temperature corrections.

According to an exemplary embodiment, the scanner controller is capable of controlling image sensors with multiple pixel clock rates, is capable of controlling monochrome and color image sensors which produce an optical resolution ranging from 100 dpi to 4800 dpi, and is capable of controlling at least one fast Analog to Digital Converter in order to acquire the image from at least one document image sensor. The at least one Analog to Digital Converter may be integrated onto the scanner controller, to acquire video signals and other analog signals. The scanner controller according to the present invention may also include at least one Digital to Analog Converter integrated onto the scanner controller, to produce analog control signals.

Additionally, the scanner controller according to the present invention is capable of simultaneously acquiring a video signal from a plurality of image sensors, each image sensor having a single video output, simultaneously acquiring a plurality of video signals from an image sensor having multiple video output signals, or simultaneously acquiring the plurality of video signals from a plurality of image sensors having multiple video output signals.

The scanner controller according to the present invention can control the multiplexing of analog signals together with video signals, including sensor temperature, motor temperature, motor speed and light intensity analog signals.

In one exemplary embodiment, the pixel correction unit is capable of recognizing bad pixels, the bad pixels being caused by image sensor failure or by dust particles stuck in front of sensitive elements. Upon detection of bad pixels, the pixel correction unit is capable of replacing them automatically by interpolation of neighboring pixels.

BRIEF DESCRIPTION OF THE DRAWINGS

For a further understanding of the objects and advantages of the present invention, reference should be had to the following detailed description, taken in conjunction with the accompanying figures, in which like parts are given like reference numerals and wherein.

DETAILED DESCRIPTION OF THE INVENTION

Scanner Types

Document scanners can be distinguished as sheet-fed, flatbed, handled, slides, duplex drum and 2D scanners.

Figure 1:
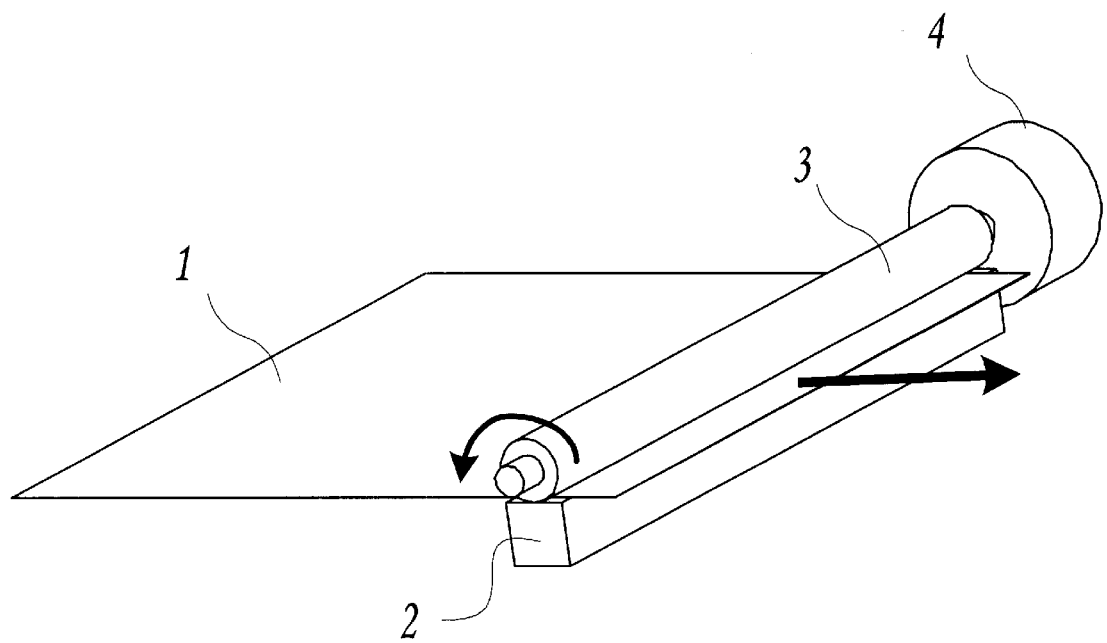
FIG. 1 is a perspective view of the major mechanical elements of a sheet-fed scanner. The electronics circuits that control the scanner and the communication link with the host computer are not represented.

FIG. 1 shows a typical sheet-fed document scanner. In FIG. 1, a document 1 is displaced by a rotating roller paper feeding mechanism 3 driven by a motor 4 over a fixed linear sensor 2 that senses reflected light from the document. Alternatively, the paper feeding mechanism can be a wide belt, a plurality of rollers or a plurality of rollers and belts. Illumination is provided from the linear sensor side. The linear sensor, together with its associated electronics, records a line of information at a time. When the document is driven by the motor and the roller, the linear sensor, together with its associated electronics, records the entire document area swept. The scanner control electronics and the communication link with the host computer are not shown in FIG. 1.

Figure 2:
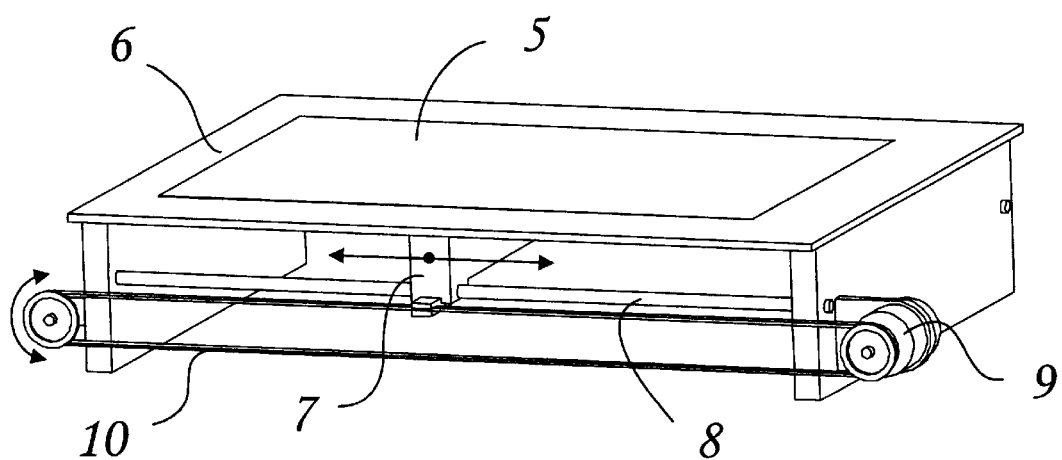
FIG. 2 is a perspective view of the major mechanical elements of a flatbed scanner. The electronics circuits that control the scanner and the communication link with the host computer are not represented.

FIG. 2 shows a typical flatbed document scanner. In FIG. 2, a document 5 is placed on a flat transparent support 6 such as thin glass, and a linear sensor 7 is displaced under the glass using sliding guides 8, a motor 9 and a belt 10. For reflective documents, illumination is provided from the sensor side, that is, the light traverses the glass support and reflects on the surface of the document. For transparent documents, illumination is provided from behind the document such that light traverses the document and the glass support. The linear sensor, together with its associated electronics, records a line of information when not in motion. When driven by the motor, belt and guides, the linear sensor, together with its associated electronics, records the entire document area swept. Some flatbed scanners can be fitted with a document feeder that introduces and places the document over the transparent support and then ejects the document when the scanning operation is completed. The linear sensor does not record any information while the document is being fed in. The scanner control electronics and the communication link with the host computer are not shown in FIG. 2.

Figure 3:
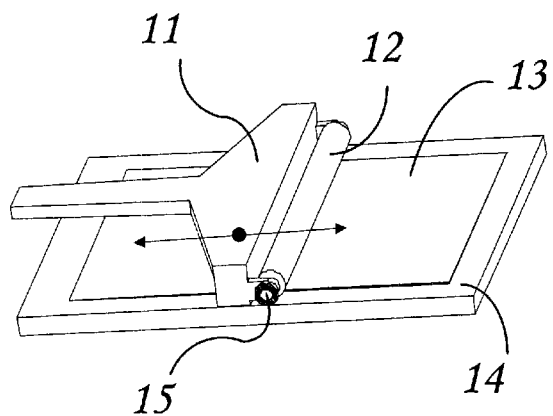
FIG. 3 is a perspective view of the major mechanical elements of a handheld scanner. The electronics circuits that control the scanner and the communication link with the host computer are not represented.

FIG. 3 shows a typical handheld document scanner. In FIG. 3, a document 13 is placed on a flat support 14. A handheld apparatus that integrates a linear sensor 11, a roller 12 and a rotary encoder 15 is dragged over the document. During the dragging operation, the roller rotates and the rotary encoder provides a stream of pulses related to the displacement of the handheld apparatus over the document. The electronics associated with the linear sensor and rotary encoder generate an image of the document area swept. The scanner control electronics and the communication link with the host computer are not shown in FIG. 3.

Figure 4:
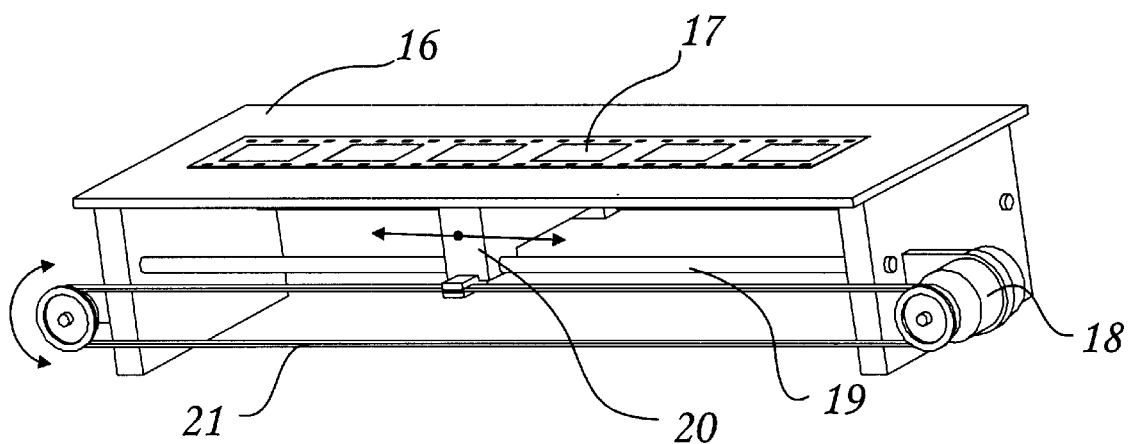
FIG. 4 is a perspective view of the major mechanical elements of a slides scanner. The electronics circuits that control the scanner and the communication link with the host computer are not represented.

FIG. 4 shows a typical slides document scanner. In FIG. 4, a document 17 which is a positive film, a negative film or a photographic slide is placed on a flat transparent support 16 such as thin glass, and a linear sensor 20 is displaced under the glass using sliding guides 19, a motor 18 and a belt 21. Illumination is provided from behind the document such that light traverses the document and the glass support. The linear sensor, together with its associated electronics, records a line of information when not in motion. When driven by the motor, belt and guides, the linear sensor, together with its associated electronics, records the entire document area swept. The scanner control electronics and the link with the host computer are not shown in FIG. 4.

In an alternative design, the mobile carriage that displaces the image sensor can be substituted with an apparatus wherein the line image sensor is fixed, and an oscillating mirror driven by a stepper motor deflects the light received from the document in order to create the sweep across the document.

Figure 5:
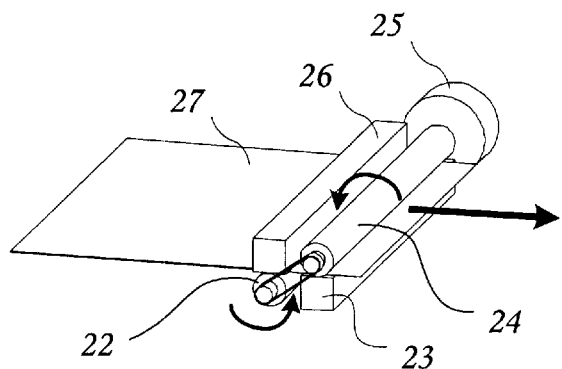
FIG. 5 is a perspective view of the major mechanical elements of a duplex scanner. The electronics circuits that control the scanner and the communication link with the host computer are not represented.

FIG. 5 shows a typical duplex document scanner. In FIG. 5, a document 27 is displaced by two rotating rollers 22 and 24 driven by a motor 25 over two fixed linear sensors 26 and 23 that sense reflected light from each of the two sides of the document. Alternatively, the paper feeding mechanism can be a plurality of wide belts, or a plurality of rollers and belts. Illumination is provided from each linear sensor. The linear sensors, together with their associated electronics, record a line of information for each side of the document. When the document is driven by the motor and the rollers, the linear sensors, together with their associated electronics, record the entire document area swept on both sides. The scanner control electronics and the communication link with the host computer are not shown in FIG. 5.

Figure 6:
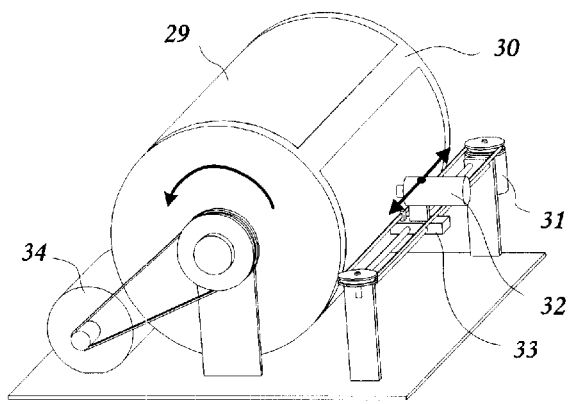
FIG. 6 is a perspective view of the major mechanical elements of a drum scanner. The electronics circuits that control the scanner and the communication link with the host computer are not represented.

FIG. 6 shows a drum document scanner. In FIG. 6, a document 29 is fixed over a drum 30 of predetermined size. A motor 34 rotates the drum. A single point sensor 32 is fixed on a sliding carriage 33 that is actuated by a motor 31. The sensor, together with its associated electronics, records a line of information for each rotation of the drum when the carriage is not in movement. The carriage is displaced a small amount at each rotation of the drum in such a way that the entire document area is swept. The electronics that drive the two motors and the sensor generate an image of the document. The scanner control electronics and the communication link with the host computer are not shown in FIG. 6.

Figure 7:
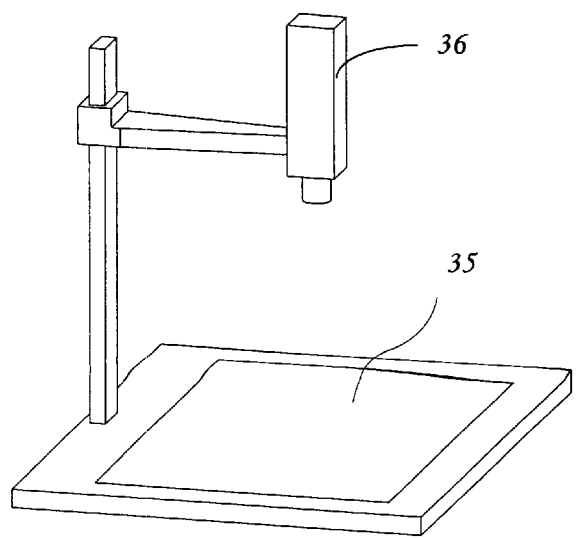
FIG. 7 is a perspective view of the major mechanical elements of 2D still-image scanner. The electronics circuits that control the scanner and the communication link with the host computer are not represented.

FIG. 7 shows a typical 2D still-image document scanner. In FIG. 7, a document 35 is placed on a support under a camera 36 that uses a two-dimensional sensor. The camera generates an image of the entire document. There are no parts in movement while the document image is generated. The illumination is usually created using spotlights or fluorescent lights. The scanner control electronics and the communication link with the host computer are not shown in FIG. 7.

The image sensors used in sheet-fed scanners, flatbed scanners, handheld scanners, slide scanners and duplex scanners are either—CCD (Charged Coupled Device) monochrome or color sensors with a width of approximately 40 to 60 mm. They are fitted with a suitable 20 optical apparatus to reduce and focus the image of the document and an illumination source, which may be either a monochrome CIS (Contact Image Sensor) or a color CIS. The contact image sensors are usually available in B6, A4, A3 sizes, or approximately 100 mm to 300 mm.

The image sensors used in the drum scanners are single point light sensors. The image sensors used in the 2D still-image scanners are two-dimensional CCD (Charged Coupled Device) monochrome or color sensors.

The image sensors produce an analog video signal that is commonly called a video signal.

The illumination for sheet-fed scanners, flatbed scanners, handheld scanners, slide scanners and duplex scanners is produced using LEDs (Light Emitting Diodes), CCFL (Cold Cathode Fluorescent Light) tubes, electro-luminescent screens or filament lamps. Color dropout, that is the elimination of a color, is produced using color filters that block the required wavelength or by selecting light sources that directly generate the required wavelength.

Figure 8:
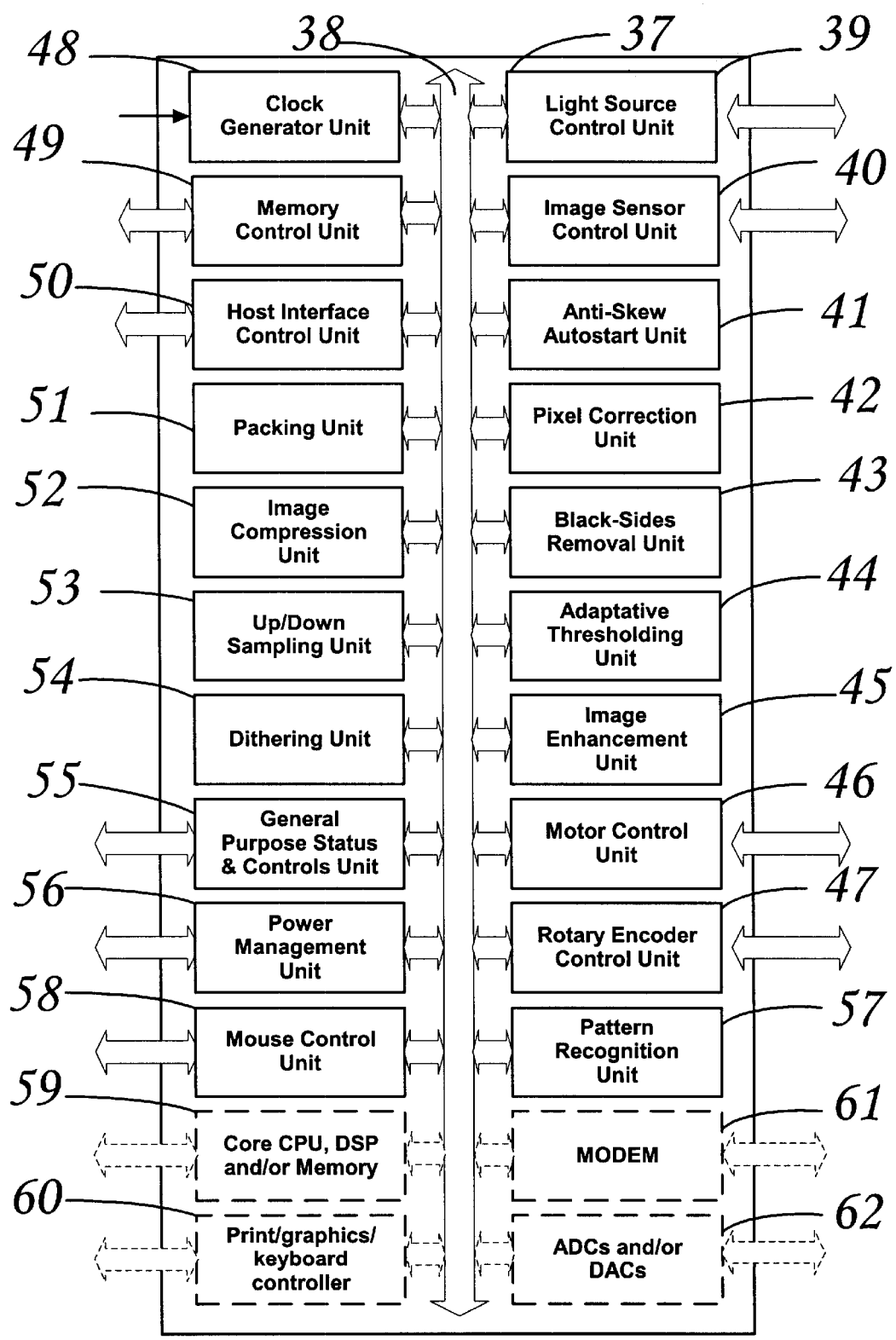
FIG. 8 is a diagram representing the architecture of the Universal Document Scanner Controller according to the present invention.

FIG. 8 shows the architecture of the Universal Document Scanner Controller according to the present invention. The Universal Document Scanner Controller according to the present invention is a circuit 37 that integrates all of the control functions that are required to operate sheet-fed scanners, flatbed scanners, handheld scanners, slides scanners, duplex scanners, drum scanners and 2D still-image scanners. The Universal Document Scanner Controller is composed of twenty specialized units: the Light Source Control Unit 39, the Image Sensor Control Unit 40, The Anti-Skew Auto-Start Unit 41, the Pixel Correction Unit 42, the Black Sides Removal Unit 43, the Adaptative Thresholding Unit 44, the Image Enhancement Unit 45, the Motor Control Unit 46, the Rotary Encoder Control Unit 47, the Clock Generator Unit 48, the Memory Control Unit 49, the Host Interface Control Unit 50, the Packing Unit 51, the Image Compression Unit 52, the Up/Down Sampling Unit 53, the Dithering Unit 54, the General Purpose Status and Control Unit 55, the Power Management Unit 56, the Pattern Recognition Unit 57 and the Mouse Control Unit 58. The twenty specialized units are interconnected to and intercommunicate via an internal bus 38. Additional elements 59, 60, 61 and 62 may be integrated into the Universal Document Scanner Controller according to the present invention. These additional elements are: a Library Synthesized Core CPU 59 (Central Processing Unit), DSP (Digital Signal Processor) and/or Memory, a Print and/or Graphics and/or keyboard Controller 60, a Modem 61 or other communications device and ADCs (Analog to Digital Converters) and/or DACs (Digital to Analog Converters) 62. Elements 59, 60, 61 and 62 are also connected and communicate via the internal bus 38.

The Universal Document Scanner Controller does not make use of programmed instructions stored in external memory to operate the specialized functions. Indeed, the Universal Document Scanner Controller according to the present invention relies essentially on direct interconnections between electronic gates to perform the specialized functions of at least the units 39, 40, 41, 42, 43, 44, 45, 46, 47, 48, 49, 50, 51, 52, 53, 54, 55, 56, 57 and 58. Intercommunication between these units is carried out via the internal bus 38. The Universal Document Scanner Controller executes all of the specialized functions at extremely high speed because it makes use of hard-wired or microcoded specialized circuits instead of software programmed instructions. The host processor that communicates with the Universal Document Scanner Controller via the Host Interface Control Unit 50 creates and maintains some configuration tables that are stored in the memory and that are used by the specialized functions. The host processor can carry out some auxiliary functions that do not require very-high speed execution such as interpretation of statuses from the General Purpose Status and Controls Unit 56. In an alternate embodiment, the core CPU 59 uses programmed instructions stored in memory to perform auxiliary tasks or functions that may be required but that do not impact the performance of the Universal Document Scanner Controller.

The Universal Document Scanner Controller integrates powerful algorithms that are useful when scanning of all sorts of documents. The Universal Document Scanner Controller of the present invention, therefore, can be readily and advantageously mass-produced. The algorithms use microcoded logic and consequently exhibit very high performance, are highly flexible and allow low cost document scanners to be produced making use the Universal Document Scanner Controller according to the present invention.

To suit various requirements, the Universal Document Scanner Controller takes several forms: a VHDL (Very High Definition Language) source code, a circuit implemented on a single piece of silicon integrated circuit or silicon dice, a high level hybrid circuit or a MCM (Multi Chip Module). The Universal Document Scanner Controller, as set forth above, may be integrated on a same circuit with other functional units such as a core CPU, a core DSP, a core modem or other telecommunication circuit, print and/or graphics and/or keyboard controller, or other chip set. These additional functional units are shown in FIG. 8 in dashed lines, indicating that these elements may but need not be integrated into the Universal Document Scanner Controller 37 according to the present invention. In FIG. 8, the Core CPU, DSP and/or Memory is referenced as numeral 59, the Print and/or Graphics and/or Keyboard Controller as numeral 60, the Modem or other communications device as numeral 61 and the ADCs and/or DACs are designated as reference numeral 62. Each of the additional elements is connected to and communicates with the other functional units of FIG. 8 via the internal bus 38.

Clock Generator

The Clock Generator Unit 48 provides all of the internal timing signals required by the Universal Document Scanner Controller and all of the external timing signals required by the external electronics of the scanner.

Memory Control Unit

The Memory Control Unit 49 controls the access to external or internal volatile memory devices and to non-volatile memory devices. Volatile memory devices are of the RAM (Random Access Memory) type such as SRAM, DRAM and other RAM memories. Non-volatile memory devices are of the E2PROM (Electrically Erasable Programmable Random Access Memory, or EEPROM) type, serial E2PROM, Flash type or equivalent type. External memory is used to store data and to retrieve data such as configuration data, calibration data, look-up tables and working data. The Memory Control Unit 49 is capable of performing FIFO (First-In First-Out) data access. An example of such volatile external memory is shown at reference numeral 910 and 1010 in FIG. 9 and FIG. 10, respectively.

In an alternative embodiment, all or a portion of the volatile and/or the non-volatile memory may be integrated directly into the Universal Document Scanner Controller, that is, on the same circuit, as shown at reference numeral 59 in FIG. 8. This is technically feasible but economical considerations will direct this choice for mass production of the Universal Document Scanner Controller according to the present invention.

Image Sensor Control Unit

Monochrome

Figure 9:
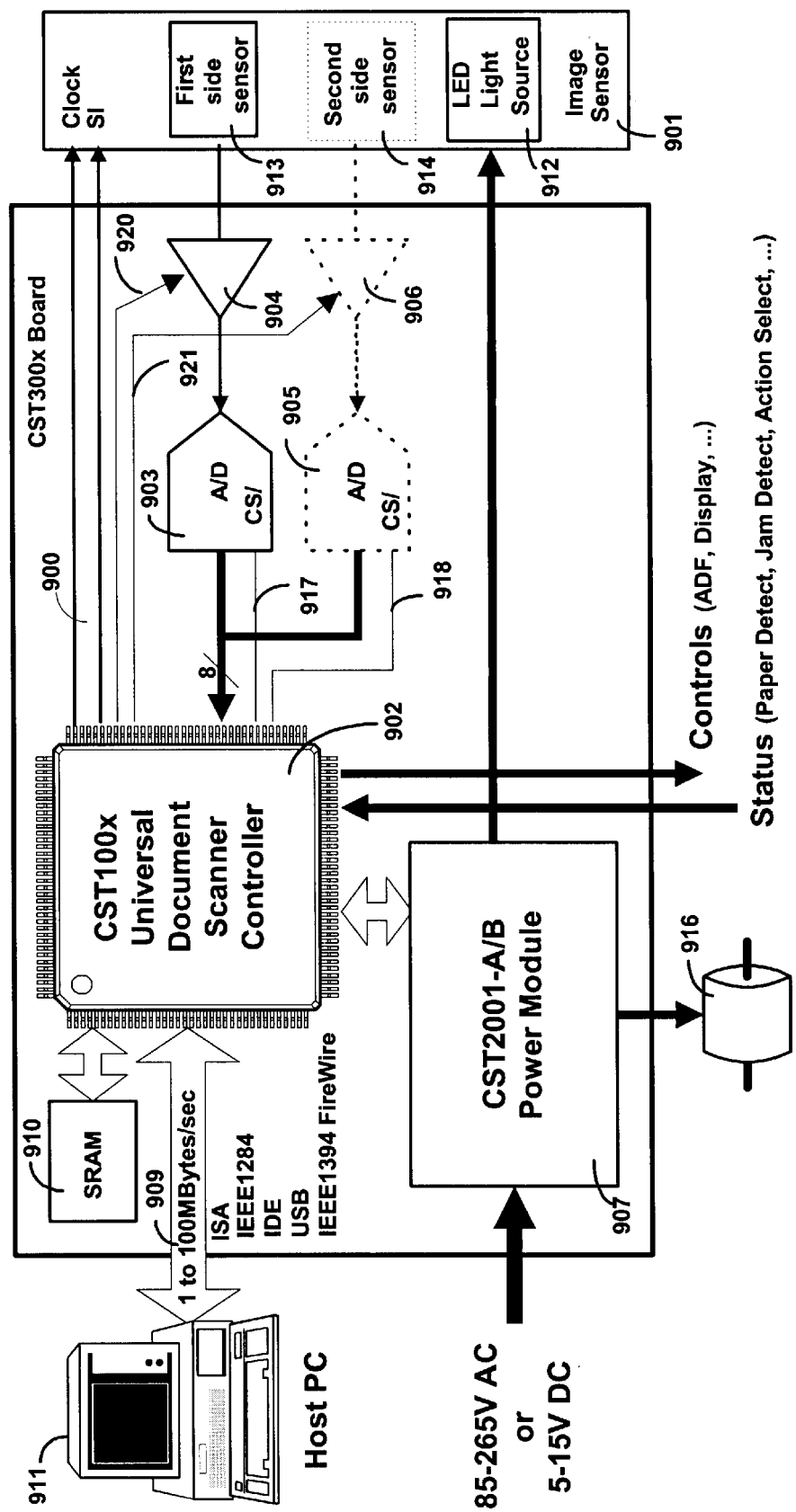
FIG. 9 is a circuit block diagram showing an implementation of a monochrome simplex/duplex scanner using the Universal Document Scanner Controller according to the present invention.

The Image Sensor Control Unit 40 controls and acquires image data from all types of monochrome image sensors such as CIS (Contact Image Sensors), non-contact image sensors, line CCD (Charged Coupled Devices) and 2D CCD (Two Dimensional Charged Coupled Devices). Image sensors generate what is commonly called a video signal that corresponds to the light reflected from the document or passing through the document. The Image Sensor Control Unit 40 generates the synchronization signals required by monochrome sensors. The Image Sensor Control Unit 40 generates the signals required to control one or more of the internal or external ADCs (Analog to Digital Converters) that converts the analog video signal generated by the image sensor into corresponding digital information. Two such ADCs are shown in FIG. 9 at 903 and 905. The control lines for controlling the ADCs 903 and 905 are shown at reference numerals 917 and 918, respectively. The Image Sensor Control Unit 40 can accommodate all types of fast ADCs ranging from 1 million ($10^6$) samples per second to 1 billion ($10^9$) samples per second, and data words of 1 bit to 16 bits in width for each sample. Digital words associated with a sensor video sample are commonly called pixels. The digital word associated with a pixel determines what is commonly called its gray level. Digital words for color pixels are a combination of the equivalent of 3 gray level pixels and have a width ranging from 8 bits to 48 bits.

In an alternative embodiment, the Universal Document Scanner Controller integrates the ADCs 903 and 905 directly onto the same circuit, as shown at reference numeral 62 in FIG. 8. This is possible when making use of mixed-signals application specific integrated circuit technology.

The Image Sensor Control Unit produces, in cooperation with the Clock Generator Unit 48, multi-rate pixel clock signals and associated control signals. The host computer cooperates with the Image Sensor Control Unit 40 in order to automatically determine the maximum pixel clock-rate that can be supported, taking into account the host computing power and the communication bandwidth between the host computer and the Universal Document Scanner Controller. A communication link between the Universal Document Scanner according to the present invention is shown at 909 and 1009 in FIGS. 9 and 10, respectively.

The Image Sensor Control Unit 40 synchronizes the linear sensor pixel clocks and control signals with an external source such as the rotary encoder of a handheld scanner or a scanner that make use of a linear motor instead of a stepper motor for paper feeding or sensor displacement. The rotary encoder inputs and associated decoding logic are located in the Rotary Encoder Control Unit 47.

Duplex/Color/Multi-Output

The Image Sensor Control Unit 40 of FIG. 8 is capable of controlling a predetermined number of linear sensors simultaneously, a predetermined number of video outputs simultaneously from a given sensor, or a predetermined number of linear sensors having multiple video outputs simultaneously while retaining the same characteristics described in the paragraphs above. This feature is useful for duplex scanners, color scanners and multi-outputs linear sensors.

FIG. 9 is a circuit block diagram representing an implementation of a monochrome simplex/duplex scanner 900 using the Universal Document Scanner Controller 902 according to the present invention. The circuit of FIG. 9, when ADC 905 and amplifier 906 are present, is an implementation of a Duplex Monochrome scanner. Such a scanner comprises two linear sensors, one for each side of the document to be scanned. When only ADC 903 and amplifier 904 are present, the circuit of FIG. 9 is an implementation of a Simplex Monochrome scanner.

The Universal Document Scanner Controller, referenced at 37 in FIG. 8 and at 902 in FIG. 9, therefore, controls the ADCs 903 and 905, as well as their associated respective amplifiers 904 and 906. The amplifiers 904 and 906 amplify the analog output from the image sensor 901. In particular, in the case of a Duplex scanner, the amplifiers 904 and 906 receive the analog outputs from the sensors 913 and 914 located on each side of the document to be scanned, selectably and controllably amplify these signals, and present their amplified outputs to the inputs of the ADCs 903 and 905. Control signals for the amplifiers 904 and 906 are carried from the Image Sensor Control Unit 40 to the amplifiers 904 and 906 by control lines 920 and 921. The digitized outputs from the ADCs 903 and 905 are then presented to the Image sensor control unit 40 of FIG. 8. In the case of a Simplex scanner, only the digitized output of ADC 903 is presented to the Image Sensor Control Unit 40. The ADCs 903 and 905 receive timing control signals via control lines 917 and 918, respectively.

The bi-directional communication link between the host system, such as a host Personal Computer 911 is shown at 909. The communication link 909 links the host system 911 and the scanner 900 via the Host Interface Control Unit 50, shown in FIG. 8. The Scanner Power Module communicates with the Power Management Unit 56 of Controller 37 (shown in FIG. 8) via a bi-directional bus. The Scanner Power Module is further disclosed in application No. 08/902,871, now U.S. Pat. No. 5,847,948, the disclosure of which is incorporated herewith in its entirety. The Scanner Power Module 907 provides for all of the power needs of the scanner, such as the power requirements of LED light source 912 or the power needs of motor 916, which may be one or a plurality of linear, stepper or micro stepping motors. The Scanner Power Module is configured to receive a wide range of voltages, either from a municipal power grid or from DC levels commonly available from computer power supplies. For example, the Scanner Power Module is adapted to receive AC voltages in the range of 85 to 265 V AC and DC levels from 5 to 15 volts. Internal AC-DC and DC-DC converters and signal conditioners provide for all power levels necessary to run a wide variety of document scanners and all sub-components thereof.

Figure 10:
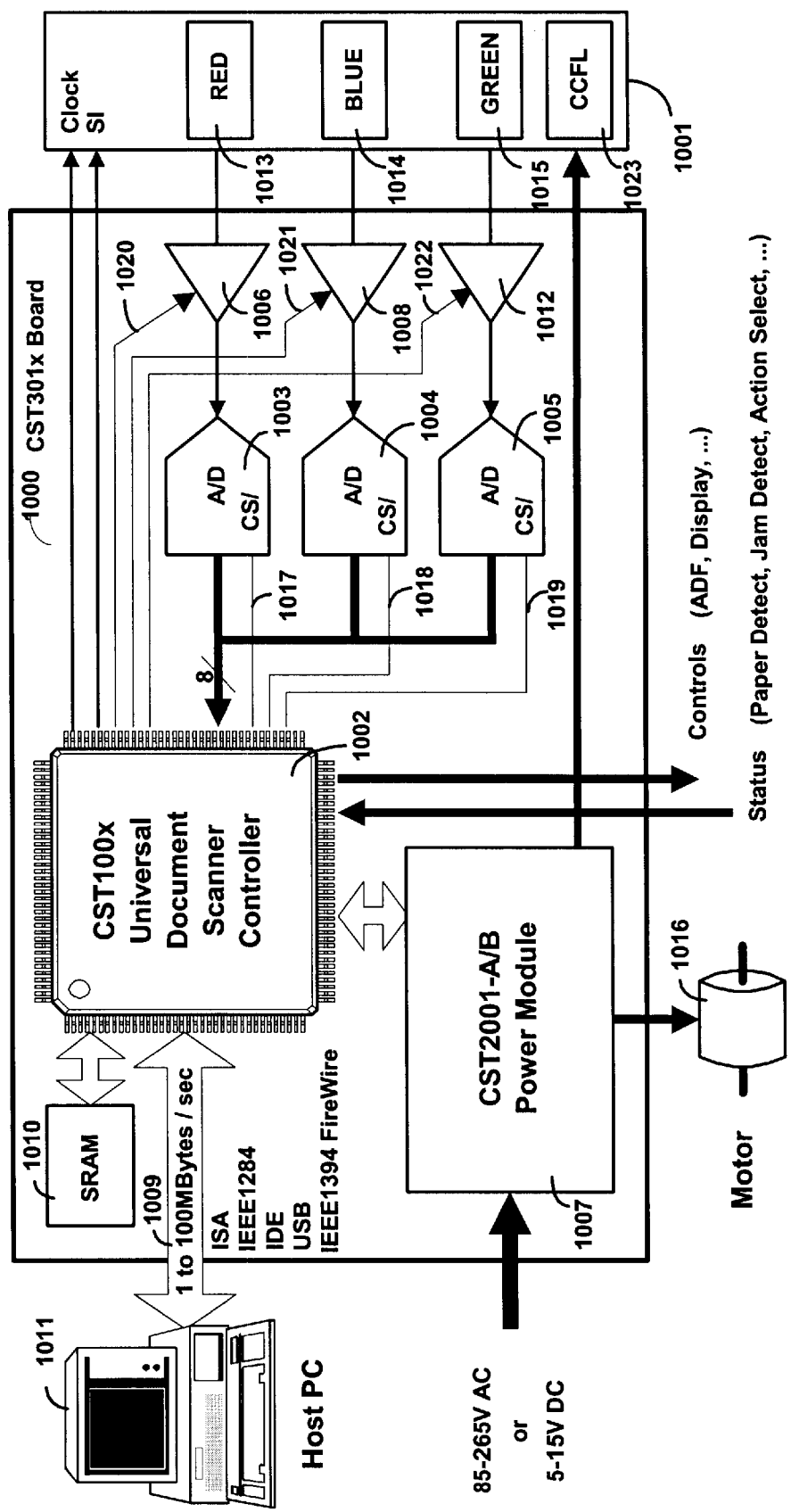
FIG. 10 is a circuit block diagram showing an implementation of a color scanner using the Universal Document Scanner Controller according to the present invention.

FIG. 10 is a circuit block diagram representing an implementation of a color scanner 1000 using the Universal Document Scanner Controller 1002 according to the present invention. In the case of color linear sensors, as shown at 1000 in FIG. 10, three video outputs are generated. Duplex color scanners have two linear sensors (one on each side of the document to be scanned), each linear sensor having three sensors: a green sensor 1015, a blue sensor 1014 and a red sensor 1013, resulting in six video signals to process. A CCFL light source 1023 replaces the LED light source 903 found in the monochrome image sensor 901 of FIG. 9. In the color scanner 1000, each of the Green, Blue and Red sensors 1015, 1014 and 1013 have their analog output tied to analog amplifiers 1012, 1008 and 1006, respectively. The analog amplifiers 1006, 1008 and 1012 selectively and controllably amplify the analog color signals presented thereto, the control signals being carried by control lines 1020, 1021 and 1022, respectively, originating from the Image Sensor Control Unit 40. The outputs of the analog amplifiers 1006, 1008 and 1012 are then digitized by the ADCs 1003, 1004 and 1005. The ADCs 1003, 1004 and 1005 receive timing and control signals from control lines 1017, 1018 and 1019, respectively. The remainder of the circuit of FIG. 10 is similar to that of FIG. 9, with similar elements being assigned like reference numerals. For example, the motor 1016 is connected to and controlled by the Scanner Power Module 1017 in the same manner as is the motor 916 to Scanner Power Module 907. An extended discussion of the remainder of FIG. 10 is, therefore, omitted for the sake of brevity. As the person of skill in this art will recognize, FIGS. 9 and 10 represent but one possible embodiment of monochrome and color scanners, respectively. Various structural changes may be made to either of the above-described circuits without, however, departing from the spirit and scope of the present invention.

In order to achieve higher output pixel rates, the linear sensors shown in either FIGS. 9 or 10 may have multiple video outputs. For example, a linear sensor having two video outputs, each video output being associated with a bank of pixels that is one half of the total number of pixels, can produce an effective pixel rate that is double. Similarly, a linear sensor having four video outputs can produce an effective pixel rate that is quadruple.

The Image Sensor Control Unit 40 is capable of controlling multiple sensors and acquiring multiple video signals by multiplexing signals with one or several ADCs. The Image Sensor Control Unit 40 can control the multiplexing of other types of analog signals together with the video signals, such as image sensor temperature, motor temperature, motor speed and light intensity analog signals.

The Image Sensor Control Unit 40 can accommodate single point monochrome and color image sensors. Alternatively, the Image Sensor Control Unit 40 can accommodate 2D (two-dimensional) monochrome and color image sensors.

The Image Sensor Control Unit 40 can convert color pixels into gray level pixels by arithmetically adding the three colors together for a given pixel, or by selecting one color as being the gray level, or by any other arithmetic combination of the colors. To do this, the Image sensor Control Unit may incorporate an internal ALU (Arithmetic Logic Unit). In an alternative embodiment, the Image Sensor Control Unit 40 integrates one ADC or multiple ADCs directly onto the same circuit together with an analog multiplexer. This is possible when making use of mixed-signals ASIC (Application Specific Integrated Circuit) technology but economical considerations will direct the choice for mass production of the Universal Document Scanner Controller according to the present invention.

The Image Sensor Control Unit 40 can accommodate monochrome and color, single point, line and 2D image sensors having direct digital output, that is, image sensors that integrate ADC (Analog to Digital Conversion) circuits.

Figure 14:
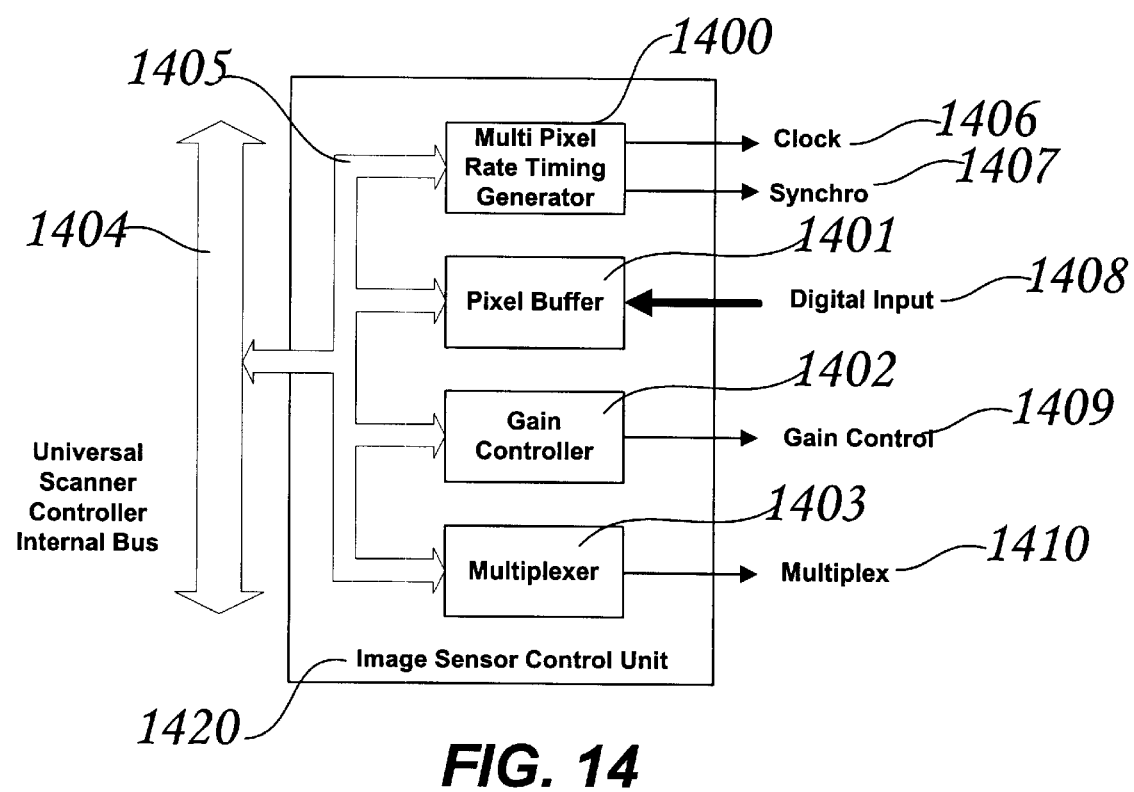
FIG. 14 is a block diagram showing the Image Sensor Control Unit according to the present invention.

The Image Sensor Control Unit comprises four basic functions as shown in FIG. 14. These functions are a Multi Pixel Rate Timing Generator 1400, a Pixel Buffer 1401, a Gain Controller 1402 and a Multiplexer 1403. The four functions communicate between themselves via a local bus 1405 and with the other specialized units of the Universal controller via the Internal Bus 1404.

The multi Pixel Rate Timing Generator 1400 provides the clock signals 1406 and the synchronization signals 1407 required to drive the images sensors at the various speeds according to the scan mode. One of the particularities of the universal scanner is to maximize the speed at which the document is read and the digital image transferred to the host computer, depending on the scanning mode selected. For example, for a given host configuration and hardware interface, if 100 dpi and B&W mode is selected, the time to read a letter size document is in the order of 0.5 second. If in the 400 dpi and 8-bit gray scale mode is selected, the time to read the document is approximately 3 second. The pixel rate in the first case is 4Mega-pixels per second, and in the second case, the pixel rate is 1Mega-pixel per second. The image sensor is therefore driven at various pixel clock rates. Each of the scanning modes requires a special calibration with a given light source intensity controlled by the Light Source Control Unit 39. The Multi Pixel Rate Timing Generator 1400 is configured and controlled by look-up tables maintained in memory controlled by the Memory Control Unit 49. The clock signals 1406 and synchronization signals can drive multiple image sensors.

The Pixel Buffer 1401 provide the necessary buffering circuits to interface with at least one Analog to Digital Converter 903, 905 that converts the video signal or the plurality of video signals into digital numbers. The at least one Analog to Digital Converter is controlled by the Multiplexer 1403 for synchronization of digitization and selection of the video signal source.

The multiplexer 1403 controls at least one Analog to Digital Converter 903, 905 and the multiplexing of video signals and other analog signals.

The Gain Controller 1402 controls the gain of the video amplifiers 920, 906

Light Source Control Unit

The Light Source Control Unit 39 controls the turning-on, turning-off and the intensity modulation of all types of light sources, such as LED (Light Emitting Diodes) areas, CCFL (Cold Cathode Fluorescent Light), Electro luminescent screens, and filament lights or bulbs. Examples of LED and CCFL light sources controlled by the Light Source Control Unit 39 are shown at 912 in FIG. 9 and 1023 in FIG. 10.

The Light Source Control Unit 39 is also capable of supplying signals to enable the selection of color filters for filter-type color scanners and for color dropout.

The Light Source Control Unit 39 cooperates with the Motor Control Unit 46 to synchronously drive the motor that selects the color filters.

The Light Source Control Unit 39 controls one or a plurality of external DAC (Digital to Analog Converters) and associated power circuits to modulate the illumination switch-on, switch-off and intensity modulation, as discussed in relation to FIGS. 9 and 10.

In an alternative embodiment, the Light Source Control Unit 39 integrates one DAC or a plurality of DACs directly onto the same circuit. This is possible when malting use of mixed-signals ASIC (Application Specific Integrated Circuit) technology but economical considerations will direct this choice for mass production of the Universal Document Scanner Controller. Alternatively, the Light Source Control Unit 39 may cooperate with DACs 62 in functional unit 62 in FIG. 8

Motor Control Unit

The Motor Control Unit 46 comprises means for controlling all types of motors used in sheet-fed, flatbed, slides, duplex, drum and 2D still-picture scanners. The types of motors are stepper motors and linear motors. The Motor Control Unit can control a plurality of stepper motors and linear motors, such as stepper motors to displace the document while acquiring the image or linear motors for bulk paper feeding. The Motor Control Unit cooperates with the Rotary Encoder Control Unit 47 for closed-loop speed and position control of linear motors.

The Motor Control Unit is capable of generating smooth trapezoidal-curve or S-curve accelerations and decelerations for linear and stepper motors. To do this, the Motor Control Unit may use a look-up table prepared by the host computer and downloaded into the memory for very high speed access. Alternatively, the Motor Control Unit may execute directly some specific micro-coded algorithms.

The Motor Control Unit can control all types of ordinary or hybrid stepper motors such as unipolar, bi-polar, tri-phase or 5-phase stepper motors. The Motor Control Unit can accommodate stepper motors with any step angle, such as 24 steps, 48 steps, 100 steps, 200 steps or 400 steps per revolution. The Motor Control Unit can accommodate any amount of gear ratio used in motorized motion mechanisms.

The Motor Control Unit is capable of controlling stepper motors in the micro-step mode to enable fine position control, high starting torque, anti-vibration operation, very fast step-rate and optimum energy efficiency. Micro stepping is achieved by precisely controlling the amount of current in the stepper motor windings at any given time, using power circuits. The profile of the current is defined in look-up tables that are contained in external or internal memory associated to the Universal Document Scanner Controller. These current profile values may be downloaded from the host computer. The current profile of the windings can be optimized for various operating conditions such as acceleration/deceleration rate, maximum load, maximum speed, minimal vibration, or motor temperature.

The Motor Control Unit 49 is capable of generating micro-stepping current profile control signals for stepper motors using various common techniques such as direct DAC (Digital to Analog Conversion), with associated power amplifiers or PWM (Pulse Width Modulation), with associated power switching devices.

The Motor Control Unit 49 is also capable of generating control signals for controlling the speed of linear motors using various common techniques such as direct DAC (Digital to Analog Conversion), with associated power amplifiers or PWM (Pulse Width Modulation), with associated power switching devices.

The Motor Control Unit is capable of performing close-loop control of linear motors using speed or angle sensors such as rotary encoders or Hall-Effect sensors.

In an alternative embodiment, the Motor Control Unit 49 integrates one DAC or a plurality of DACs, one PWM or a plurality of PWMs directly onto the same circuit. This is possible when making use of mixed-signals application specific integrated circuit technology, but economical considerations will direct the choice for mass production of the Universal Document Scanner Controller. Alternatively, the Motor Control Unit 49 may utilize the DACs 62.

Rotary Encoder Control Unit

The Rotary Encoder Control Unit 47 provides the necessary inputs and processing logic for decoding the signals provided by one or a plurality of rotary encoders.

Anti-Skew Auto-Start Unit

Figure 11:
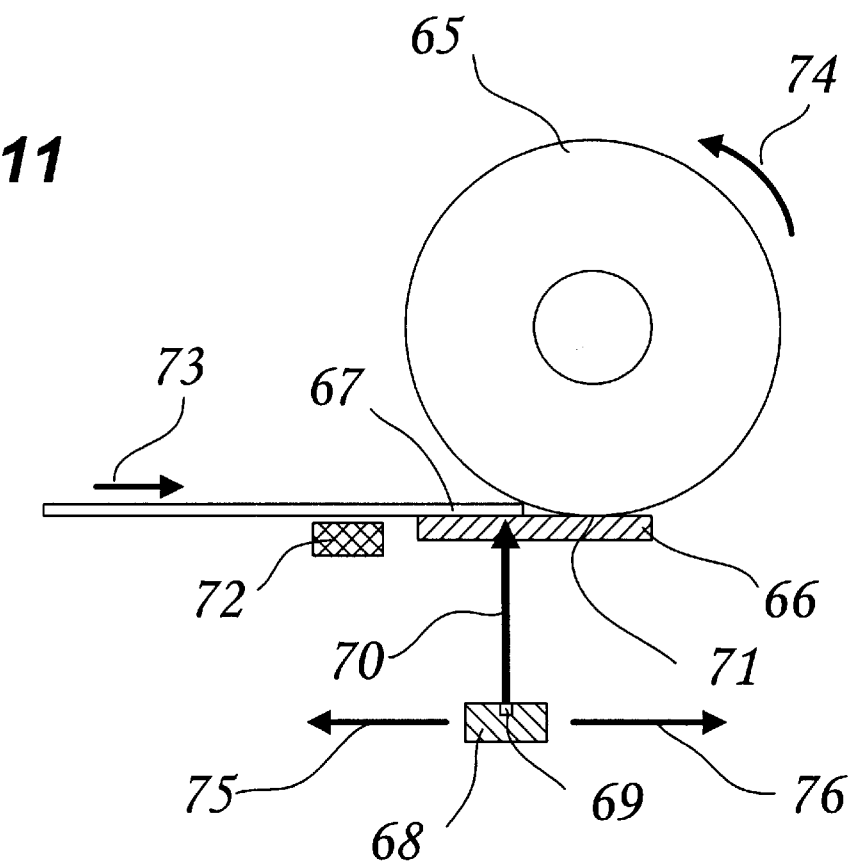
FIG. 11 is a cross-section view of the "anti-skew Auto-Start" system.

The Anti-Skew Auto-Start Control Unit 41 performs a series of control operations to ensure that the document edge is perfectly aligned before enabling the paper feed in sheet-fed scanners. A cross-sectional view of an Anti-Skew Auto-Start system is shown in FIG. 11. A top view of proximity sensors and various document sizes is shown in FIG. 12.

Figure 12:
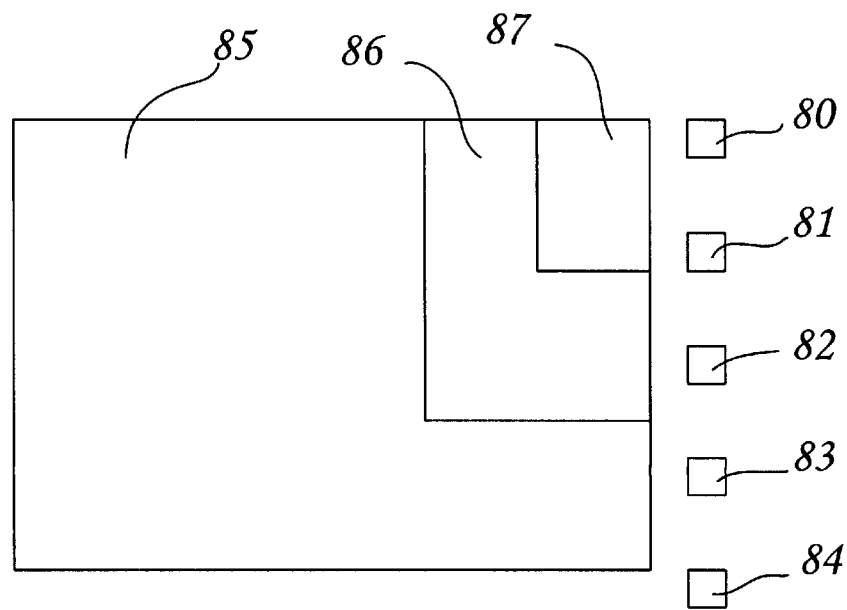
FIG. 12 is a top view of the proximity sensors of the "anti-skew Auto-Start" system with various sizes of documents aligned to one side.

In a first operational step, proximity switches 72 in FIG. 11 and 80, 81, 82, 83, 84 in FIG. 12, such as infra-red paper sensors, detect the approach of the document 67 in FIG. 11 and 85, 86, 87 in FIG. 12. The proximity sensors are arranged in such a number and in such a way that they can determine the approximate width of frequently used standard paper sizes and their offset from the side of the scanner input. The Anti-Skew Auto-Start Control Unit reacts immediately by making a request to the Light Source Control Unit 39 to activate the illumination if it was not already activated.

In a second operational step, the Anti-Skew Auto-Start Control Unit 41 monitors the upcoming stream of pixels from the image sensor pixel focus-line 70 that has been especially offset by a very small amount. This offset allows the unit to detect, assuming the roller is black or of dark color, some reflected light from the document edge as it arrives at a full stop between the roller 65 and the glass 66 of the image sensor. As the Anti-Skew Auto-Start Control Unit knows, from the proximity sensors, the approximate width of the paper and its offset from the side, it is capable of determining if the paper edge is properly aligned by matching the number of white pixels of reflected light corresponding to the white paper border with the theoretical number of pixels that should be seen in a properly aligned document. Other pixels corresponding to the black roller are black. When the minimum required number of edge pixels that are representative of an acceptably aligned document are accounted for, the Anti-Skew Auto-Start Control Unit 41 immediately sends an OK signal to the Motor Control Unit 46, which then initiates the feeding of the paper. The sensor line is offset by a very small amount which is sufficient to allow the edge of the document to be seen on the upcoming pixel stream only when the edge of the document becomes gently and uniformly pinched between the roller and the sensor. As soon as the motor starts rotating, the paper is pulled by the roller without any skew.

As soon as the motor starts, the Anti-Skew Auto-Start Control Unit 41 monitors the first few lines of the document edge to verify that the paper or document is still properly aligned. If an unacceptable skew is detected, the Anti-Skew Auto-Start Control Unit 41 orders the Motor Control Unit 41 to immediately reverse the rotation of the roller to free the document. This operation occurs very rapidly while the operator or the automatic feeder is still presenting the paper into the scanner, giving another opportunity for the paper edge to properly align itself.

The amount of the sensor line offset to achieve successful Anti-Skew Auto-Start is on the order of several hundredths of a millimeter and requires a precision adjustment mechanism, especially designed calibration tools and a corresponding calibration procedure. The sensor offset being so small, there is no possibility of defocusing, which would result in poor image resolution. Further details of the Anti-Skew Auto-Start Unit can be found in application No. 08/904,337, now U.S. Pat. No. 6,034,748, the disclosure of which is incorporated herewith in its entirety.

Alternatively, if the edges of the types of documents that are to be scanned are of dark color, the feed roller can be chosen to be of white or light color.

If the roller is black and the edge of the document is black or does not present a uniform edge, an overdrive command can be given manually by the operator through the host computer or a special function button placed on the scanner to enable the paper feed. A time-out can also activate the drive roller after the proximity sensors have detected an approaching document if no paper edge is seen by the Anti-Skew Auto-Start system.

Figure 13:
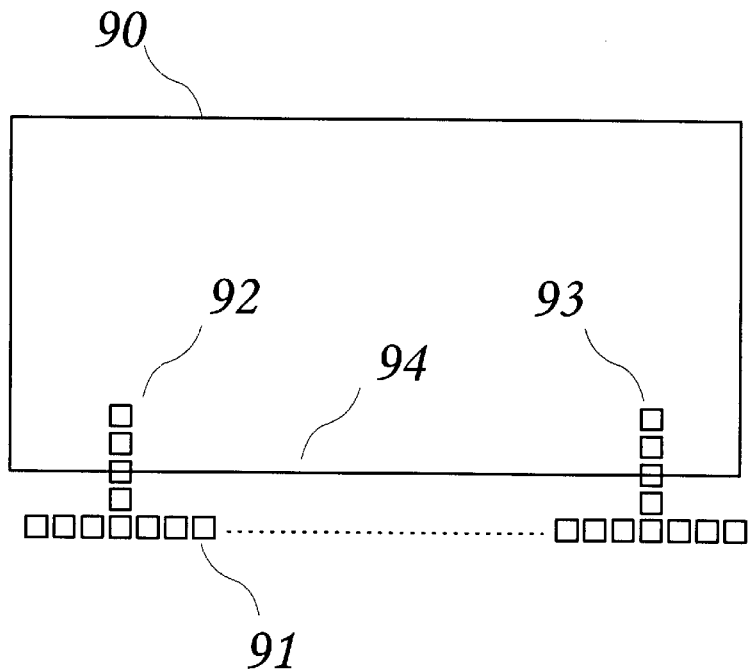
FIG. 13 is a diagram showing the "anti-skew Auto-Start" system using special paper edge detection sensors mounted in a contact image sensor.

FIG. 13 shows how paper edge detection is carried out with CIS (Contact Image Sensors) fitted with special additional sensors. The Anti-Skew Auto-Start Control Unit 41 (shown in FIG. 8) is capable of supporting contact image sensors that are fitted with additional sensors 92 and 93 to sense the paper edge 94 of a document 90 at an offset distance from the optical sensor line 91. The additional paper edge sensing sensors 92 and 93 are placed at a 90-degree angle from the optical sensor line 91 and are multiplexed with the main stream of document pixels.

The Anti-Skew Auto-Start Control Unit 41 demultiplexes the pixels from the main stream of document pixels and from the paper edge sensing pixels, then determines the relative position and alignment of the document edge.

When the relative position and alignment of the paper edge indicate an acceptably aligned document, the Anti-Skew Auto-Start Control Unit 41 immediately reports an OK signal to the Motor Control Unit 46 that can subsequently initiate the feeding of the paper. As soon as the motor starts rotating, the paper is pulled by the roller without any skew.

Pixel Correction Unit

The Pixel Correction Unit 42 performs collective and individual linear and non-linear correction of pixels at the input pixel rate, such as offset, gain, gamma and thermal correction. These operations are entirely performed using micro-coded logic such as accumulators, adders and multipliers that have been specially optimized to handle the pixel depth with acceptable rounding or truncation errors, as well as indexed or look-up tables that are contained in the memory.

In an alternative embodiment, the Pixel Correction Unit 42recognizes bad pixels that are due to image sensor failure or dust particles stuck in front of sensitive elements, and replacing them automatically by interpolation of the neighboring pixels.

Adaptative Thresholding Unit

The Adaptative Thresholding Unit 44 converts gray level pixels into black or white pixels while taking local document background into account in order to distinguish relevant features from the background. The Adaptative Thresholding Unit 44 performs the conversion to black or white pixels at the input pixel rate using micro-code logic that implements suitable algorithms. The algorithms may be known public algorithms, licensed algorithms, specially developed algorithms, derived algorithms or a combination of these. Adaptative thresholding is very effective when scanning poor quality drawings because it automatically compensates for varying background, faded areas and stains.

The Adaptative Thresholding may be disabled to enable fixed thresholding using a value set by the host computer, or a set of values that change automatically according to background density or texture.

The Adaptative Thresholding Unit 44 can convert color pixels directly into black and white pixels by making use of the color to gray level conversion resources of the Pixel Correction Unit 42.

Black-Sides Removal Unit

The Black Sides Removal Unit 43, when enabled, automatically removes, at the input pixel rate, the black sides that result from the black pixels captured on a pixel line that do not relate to the document. The black pixels are associated with the black roller that is seen by the image sensor when the document width does not cover the entire roller length. In a similar fashion, the Black Sides Removal Unit 43 ensures that no extra black pixels that are not related to the document are added at the beginning of the document scan or at the end of the document scan.

To do this, the Black-Sides Removal Unit may use a micro-coded algorithm based on public algorithms, licensed algorithms, derived algorithms, specially developed algorithms or a combination of these.

Image Enhancement Unit

The Image Enhancement Unit 45 performs, at the input pixel rate, image enhancement using public algorithms, licensed algorithms, derived algorithms, specially developed algorithms or a combination of these.

The Image Enhancement Unit 45 is capable of performing a variety of operations, such as image clean-up, despeckle, de-skew, punch-holes removal, black sides removal, sharpening, line re-generation, mirrored pixel line, black/white inversion, gray level inversion, and color inversion.

The Image Enhancement Unit 45 can take commands from the host computer or from the Pattern Recognition Unit 57.

Pattern Recognition Unit

The Pattern Recognition Unit 57 performs, at the input pixel rate, pattern recognition using public algorithms, licensed algorithms, derived algorithms, specially developed algorithms or a combination of these.

The Pattern Recognition Unit 57 is capable of performing pattern recognition algorithms such as marks detection, barcode decoding, straight lines identification, boxes identification, hot zones identification, OCR, and hand written symbols recognition in monochrome mode, in color drop-out mode or in full color mode.

Handwritten symbols recognition can be extended to the identification of letters, numbers, words and sentences against a dictionary contained in the host computer or in a look-up table maintained in local memory, thereby enabling hand-written activation. The recognition of handwritten commands or instructions can be relatively easy when applied, for example, to household appliances such as ovens, video tape recorders, central heating units, and the like where the likely vocabulary and instruction sets are limited.

Up/Down Sampling Unit

The Up/Down Sampling Unit 53 performs up sampling or down sampling of pixels at the input pixel rate, using hardwired logic. For example, the Up/Down Sampling Unit 53 is capable of down sampling from 400 dpi to 200 dpi or up sampling from 300 dpi to 1200 dpi.

Dithering Unit

The Pixel Dithering Unit 54 performs, at the input pixel rate, monochrome and color pixel dithering using public algorithms, licensed algorithms, derived algorithms, specially developed algorithms or a combination of these.

Image Compression Unit

The Image Compression Unit 52 performs, at the input pixel rate, document image compression using public algorithms, licensed algorithms, derived algorithms, specially developed algorithms or a combination of these.

The Image Compression Unit 52 is capable of performing image compression algorithms such as G3, G4, G5, TIFF, JPEG, JBIG, CPC Cartesian Perceptual Compression, fractal, and wavelet algorithms.

General Purpose Status, and Control Unit

The General Purpose Status and Control Unit 55 monitors digital input lines such as operator commands, error conditions, paper jam conditions, digit-switch settings, thumb-wheels settings, selectors and electronics status, and sends out digital signals to devices such as status indicators, LCD or LED digital readouts, solenoid drivers, linear motor drivers, buzzers, etc. The General Purpose Status and Control Unit 55 can be monitored and controlled by the other internal units of the Universal Document Scanner Controller according to the present invention or by the host computer.

The General Purpose Status and Control Unit 55 determines the various operations that are requested by the operator by pressing a button or by selecting a dial button. For example, a start button can be pressed by the operator to override the Anti-Skew Auto-Start Unit because of abnormal paper condition. This same button can be assigned to various functions according to the context of the scanner at a given time. For example, the start button can become the release button when the buzzer is activated to signal the occurrence of a paper jam.

An operator selector switch or wheel can be set to indicate, prior to the paper being introduced in the Auto-Start scanner, a given scan and forward configuration that must be used. For example, selection A may request a preset configuration for scanning all following text document pages at 200 dpi resolution and storing them by defaults in the input box of the host computer. Selection B may request that the following document pages are to be scanned at 300 dpi with 4-bit gray level using a given image enhancement algorithm and storing the image of the documents in the financial department output tray of the e-mail box. Selection C may request that the following scanned documents are to be scanned at 200 dpi in black and white level using a pre-set adaptative thresholding algorithm, G4 compression and automatically pop-up a window to dial-up a fax number. Selection D may request local printing of the following documents at 400 dpi without local filing.

The selection dial is very useful for very simply and extremely quickly pre-setting various scan and forward configurations for repetitive scanner activation tasks without interfering in the on-going main tasks of the host computer.

Alternatively, when pressing a given scanner button or selection, a standard mouse or a Microsoft IntelliMouse™ mouse (a mouse featuring two buttons and a top accessible rolling wheel) connected to the host computer can be automatically activated to control a pop-up windows on the host computer to rapidly select pre-set scan and forward configurations.

The General Purpose Status and Control Unit 55 includes the necessary circuits to adequately drive and modulate IR Infra Red emitting diodes and reliably discriminate the objects sensed by the IR detectors. The IR detectors are typically used to detect an approaching document, determine its approximate width and position, and detect a possible paper jam condition.

Mouse Control Unit

The Mouse Control Unit 58 can control a dedicated external mouse such as an ordinary mouse or the Microsoft IntelliMouse™ that may be connected directly to the Universal Document Scanner Controller. The mouse actions are sent to the host computer that immediately activates a pop-up selection menu as soon as the mouse is activated, to very simply and extremely quickly select various preset scan and forward configurations for repetitive scanner activated tasks, without having to interfere with the host computer on-going main tasks.

Alternatively, a top wheel and various buttons can be integrated into the scanner cover to perform the analog functions of a standard mouse or IntelliMouse™. A rotary encoder can be fitted to the wheel, which rotary encoder can be decoded by the Rotary Encoder Control Unit 47.

Packing Control Unit

The Packing Control Unit 52 performs, at the input pixel rate, packing and encapsulation of pixels in order to satisfy given data formats required by the host application software protocol such as the Twain or the ISIS standard, or the scan mode selected.

As the Universal Scanner Controller being extremely fast, its performance for reading a document is essentially limited only by the data bandwidth between the scanner and the host computer. Optimal throughput performance can be obtained by requesting a very compact packing of pixels according to the desired scan mode, that is by 1-bit for black and white image, by 2-bit for 4 levels of gray, by 4-bit for 16 levels of gray, by 6-bit or 64 levels of gray, by 8-bits for 256 levels of gray, etc.

Bit ordering, byte ordering, packet ordering, bit inversion or other simple packing requirements that would create significant overhead on the host computer can be done advantageously in micro-code in the Packing Control Unit. A simple table look-up algorithm where the table is prepared in the host computer then downloaded in the controller memory may be used to handle all type of packing requirements.

Host Interface Management

The Host Interface Control Unit 50 controls the communication between the host computer and the Universal Document Scanner Controller.

The Host Interface Controller Unit is capable of supporting a tightly coupled communication link, a direct link or a loosely coupled link between the Universal Document Scanner Controller and a host. This communication link is graphically shown as bi-directional link 909 and 1009 in FIGS. 9 and 10, respectively.

The tightly coupled communication links between the Universal Document Scanner Controller and a host computer can be an ISA bus, an EISA bus, a PCI bus, a VL bus, Intel AGP Advanced Graphics Port, any type of CPU data bus or any type of CPU local bus.

The direct communication links between the Universal Document Scanner Controller and a host computer can be a Floppy disk bus, an ATA bus, an ATAPI bus, an IDE bus, a removable IDE bus, an EIDE bus, a PCMCIA Bus, a Card Bus or any type of direct connection to host interface.

The loosely coupled communication links between the Universal Document Scanner Controller and a host computer can be Serial, Printer port, EPP, ECP, IEEE1284, USB, SCSI, IEEE1394, Ethernet, Intranet, Modem, ISDN, ATM, IrDA, AppleTalk, ADSL, HDSL, is TCP/IP, or any type of wire or wireless, public or private, secured or unsecured communication link.

Plug and Play Capability

The Host Interface Control Unit 50 is capable of supporting the Plug and Play requirements. The Host Interface Control Unit 50 relies on the Memory Control Unit 49 to store in and retrieve from the E2PROM memory, such as memory 59, the required Plug and Play identification information.

Grouping of ports

The Host Interface Control Unit 50 is capable of simultaneously supporting two or more communication links between the Universal Document Scanner Controller and the host computer in order to achieve higher data throughput. This is especially useful with USB, because host computers are usually fitted with at least two USB ports. Grouping the USB links by two, by four or more, and by implementing data splitting on the Universal Document Scanner Controller and data recombination on the host, effectively increases the global data throughput.

Power Management

The Power Management Unit 56 manages the power requirements of the Universal Document Scanner Controller internal circuits and the scanner electronics circuits to minimize power consumption. The Power Management Unit 56 cooperates with the host computer to comply with APM (Advanced Power Management) requirements.

Core CPU

In an alternative embodiment, a CPU or DSP core 59 that relies on programmed instructions can be integrated into the Universal Document Scanner Controller to perform complementary auxiliary functions. The core Central Processing Unit (CPU) may be synthesized from a public domain or commercial ASIC module library added to the scanner controller.

Power Circuits

In an alternative embodiment, all the power electronics can be integrated on the same circuit using hybrid technologies such as MCM (Multi Chip Module) or power mixed signal technology.

Scanning Terminal

In an alternative embodiment, the Universal Document Scanner Controller can integrate circuits, or be integrated with circuits, such as core CPU, core DSP, memory, core communication controller, core modem, core printer controller, core graphics controller, core keyboard controller, input devices controller, and the like to implement a complete scanning terminal on a single piece of silicon or on a high density hybrid circuit. The high number of input/output pins does not present a problem using ball grid technology instead of conventional lead technology.

Conclusions

There is a significant potential for new applications that make use of scanner technology. High integration and high performance devices such as the Universal Document Scanner Controller are enabling technologies that will considerably aid and promote the widespread use of scanners for archiving and paper-written activation. For example, a small scanner on a microwave oven might well be a very useful input device to enter cooking instructions, via a hand written "Post-It"® note. Such instructions might include the food type, weight, when to start cooking, instructions to the effect that the food is to be slowly defrosted first and instructions to keep the food warm if the operator is late because of a traffic jam. Writing "FROZEN LEG OF LAMB 5 LBS TO COOK AT 300 DEG FOR 2 HOURS FOR DINER AT 7:00 PM KEEP WARM FOR 2 MORE HOURS" on a piece of paper is a lot easier than punching in artificial, manufacturer-specified codes. For example, the elderly should not have trouble learning or using this technology. The present invention is also readily applicable to video tape recorders, central air-conditioning and other devices.

While the foregoing detailed description has described several embodiments of this invention, it is to be understood that the above description is illustrative only and not limiting of the disclosed invention. For example, the precise architecture of the Universal Document Scanner Controller may vary from that described and illustrated, consistent with the Controller's stated functions without, however, departing from the spirit and scope of the present invention. Indeed, a number of modifications will no doubt occur to persons of skill in this art. All such modifications, however, should be deemed to fall within the scope of the present invention. Thus, the invention is to be limited only by the Claims as set forth below.

What is claimed is:

1. A scanner controller for controlling a document scanner, comprising:
   an internal bus;
   a memory control unit connected to the internal bus, the memory control unit providing and controlling an access to internal and external volatile and non-volatile memory;
   an image sensor control unit, the image sensor control unit controlling and acquiring image data from at least one image sensor, the image sensor control unit including:
      a multi pixel rate timing generator configured to provide clock signals and synchronization signals required to drive the at least one image sensor at one of a plurality of speeds, as determined by a scan mode, the multi pixel rate timing generator being controlled by look up tables maintained in memory controlled by the memory control unit;

a pixel correction unit, the pixel correction unit performing calibration correction at a rate that matches an input pixel rate;

a motor control unit, the motor control unit controlling at least one motor; and a host interface unit, the host interface unit controlling communication between the scanner controller circuit and a host computer, wherein the image sensor unit, the pixel correction unit, the motor control unit and the host interface unit are connected to the internal bus, the scanner controller being implemented on one of a single piece of silicon, a multichip circuit, and a single piece of silicon together with other added circuits.

2. A scanner controller according to claim 1, wherein the at least one motor is one of a stepper motor and a linear motor.

3. A scanner controller according to claim 1, further comprising a clock generator unit connected to the internal bus, the clock generator providing all timing signals required by all internal functions and external functions of the scanner controller.

4. A scanner controller according to claim 1, further comprising a packing unit connected to the internal bus, the packing unit formatting pixels to satisfy an ordering of bits, as required by a host computer application.

5. A scanner controller according to claim 1, further comprising a light source control unit connected to the internal bus, the light source control unit controlling an illumination of all light sources commonly used in document scanners.

6. A scanner controller according to claim 5, wherein the light source control unit performs light source modulation for monochrome LED light sources, color LED light sources, CCFL Cold Cathode Fluorescent Light tubes, Electro-luminescent screens and filament lamps.

7. A scanner controller according to claim 5, wherein the light source control unit performs selection of color filters for filter-type color scanners and for color-drop-out-type scanner.

8. A scanner controller according to claim 5, wherein the light source control unit controls at least one external digital to analog converter and associated power circuits to control illumination switch-on, switch-off and intensity modulation.

9. A scanner controller according to claim 1, further comprising a general-purpose status and control unit connected to the internal bus, the general-purpose status and control unit monitoring and sending event signals.

10. A scanner controller according to claim 1, further comprising a black-side removal unit connected to the internal bus, the black-side removal unit being capable of removing pixels that are unrelated to a scanned document.

11. A scanner controller according to claim 1, further comprising an Anti-Skew Auto-Start control unit connected to the internal bus, the Anti-skew Auto-Start control unit ensuring that an edge of the document is perfectly aligned in a scanner input before enabling a scanning operation, to automatically scan the document without unacceptable skew.

12. A scanner controller according to claim 1, further comprising an adaptative thresholding unit connected to the internal bus, the adaptative thresholding unit being capable of distinguishing relevant features from a background in a conversion from gray level pixels to black and white pixels.

13. A scanner controller according to claim 1, further comprising an image enhancement unit connected to the internal bus, the image enhancement unit being capable of performing image enhancement using at least one of public algorithms, licensed algorithms, derived algorithms and specially developed algorithms.

14. A scanner controller according to claim 1, further comprising an image compression unit connected to the internal bus, the image compression unit being capable of performing image compression implementing at least one of public algorithms, licensed algorithms, derived algorithms and specially developed algorithms.

15. A scanner controller according to claim 1, further comprising a dithering unit connected to the internal bus, the dithering unit being capable of pixel dithering using at least one of public algorithms, licensed algorithms, derived algorithms and specially developed algorithms.

16. A scanner controller according to claim 1, further comprising a pattern recognition unit connected to the internal bus, the pattern recognition unit being capable of performing image recognition using at least one of public algorithms, licensed algorithms, derived algorithms and specially developed algorithms.

17. A scanner controller according to claim 1, further comprising an up and down sampling unit connected to the internal bus, the up and down sampling unit being capable of performing up-sampling or down-sampling of pixels.

18. A scanner controller according to claim 1, further comprising a rotary encoder control unit connected to the internal bus, the rotary encoder control unit providing all necessary inputs and processing logic for decoding signals delivered by at least one rotary encoder.

19. A scanner controller according to claim 1, further comprising a mouse control unit connected to the internal circuit, the mouse control unit controlling one of a standard mouse and equivalent pointing device and interpreting displacements and button selections.

20. A scanner controller according to claim 1, further comprising a core Central Processing Unit connected to the internal bus, the core Central Processing Unit operating with programmed instructions contained in memory, the core central Processing Unit being synthesized from a public domain or commercial ASIC module library added to the scanner controller to perform auxiliary functions.

21. A scanner controller according to claim 1, further comprising a power management unit connected to the internal bus, the power management unit minimizing power consumption of all circuits controlled by the scanner controller circuit.

22. A scanner controller according to claim 1, further comprising power circuits, the power circuits directly controlling all power functions of the document scanner.

23. A scanner controller according to claim 1, further comprising communication circuits, graphics display control circuits, keyboard control circuits, printer control circuits, auxiliary processing circuits and input device control circuits to control one of a complete multifunction peripheral, a complete off-line and an on-line document scanning terminal.

24. A scanner controller according to claim 1, wherein the pixel correction unit performs, at the input pixel rate, linear and non-linear pixel correction including offset, gain, gamma and temperature corrections.

25. A scanner controller according to claim 1, wherein the memory control unit includes at least one of the volatile memory and non-volatile memory.

26. A scanner controller according to claim 1, wherein the scanner controller is capable of controlling monochrome and color image sensors which produce an optical resolution ranging from 100 dpi to 4800 dpi.

27. A scanner controller according to claim 1, wherein the scanner controller is capable of controlling at least one fast analog to digital converter in order to acquire the video image from at least one document image sensor.

28. A scanner controller according to claim 1, wherein the image sensor control unit comprises the necessary multiplexing control logic and control signals to:

simultaneously acquire a video signal from a plurality of image sensors each having a single video output, simultaneously acquire a plurality of video signals from an image sensor having multiple video output signals, and simultaneously acquire the plurality of video signals from a plurality of image sensors having multiple video output signals.

29. A scanner controller according to claim 1, wherein the scanner controller can control a multiplexing of analog signals together with video signals, including sensor temperature, motor temperature, motor speed and light intensity analog signals.

30. A scanner controller according to claim 1, further comprising at least one analog to digital converter, the at least one analog to digital converter being integrated onto the scanner controller, the at least one analog to Digital Converter acquiring video signals and other analog signals.

31. A scanner controller according to claim 1, further comprising at least one digital to analog converter integrated onto the scanner controller, the at least one digital to analog converter producing analog control signals.

32. A scanner controller according to claim 1, wherein the host interface unit supports a tightly coupled communication link between the scanner controller and a host computer, the tightly coupled communication link being one of an ISA bus, an EISA bus, a PCI bus, a VL bus, Intel AGP Advanced Graphics Port, a CPU data bus and a CPU local bus.

33. A scanner controller according to claim 1, wherein the host interface unit supports a direct link between the scanner controller and a host computer, the direct link being one of a Floppy disk bus, an ATA bus, an ATAPI bus, an IDE bus, a removable IDE bus, an EIDE bus, a PCMCIA Bus, a Card Bus and a direct connection to the host interface.

34. A scanner controller according to claim 1, wherein the host interface unit supports a loosely coupled communication link between the scanner controller and a host computer, the loosely coupled communication link being one of a Serial, Printer port, EPP, ECP, IEEE1284, USB, SCSI, IEEE1394, Ethernet, Intranet, Modem, ISDN, ATM, IrDA, AppleTalk, ADSL, HDSL, TCP/IP, wired, wireless, public, private, secured and unsecured communication link.

35. A scanner controller according to claim 1, wherein the host interface unit supports Plug and Play requirements.

36. A scanner controller according to claim 1, wherein the host interface unit is capable of simultaneously supporting at least two communication links between the scanner controller and the host computer in order to achieve higher data throughput than is possible with a single communication link.

37. A scanner controller unit according to claim 1, wherein the pixel correction unit is capable of recognizing bad pixels, the bad pixels being due to one of image sensor failure and dust particles stuck in front of sensitive elements, and replacing them automatically by interpolation of neighboring pixels.

\* \* \* \* \*

UNITED STATES PATENT AND TRADEMARK OFFICE
CERTIFICATE OF CORRECTION

| | | |
|---|---|---|
| PATENT NO. | : 6,344,906 B1 | Page 1 of 1 |
| APPLICATION NO. | : 08/931131 | |
| DATED | : February 5, 2002 | |
| INVENTOR(S) | : Jean-Marie Gatto and Thierry Brunet de Courssou | |

It is certified that error appears in the above-identified patent and that said Letters Patent is hereby corrected as shown below:

On the title page, under "FOREIGN PATENT DOCUMENTS", replace the incorrect --GB 0 741 482 A2   11/1996-- with

--EP 0 741 482 A2   11/1996--

Signed and Sealed this

Eleventh Day of October, 2011

David J. Kappos
*Director of the United States Patent and Trademark Office*